United States Patent
Nagamine et al.

(10) Patent No.: US 9,900,800 B2
(45) Date of Patent: Feb. 20, 2018

(54) COMMUNICATION APPARATUS, COMMUNICATION SYSTEM, COMMUNICATION METHOD, AND RECORDING MEDIUM

(71) Applicants: Shoh Nagamine, Kanagawa (JP); Takuya Imai, Tokyo (JP); Kenichiro Morita, Tokyo (JP); Junpei Mikami, Kanagawa (JP)

(72) Inventors: Shoh Nagamine, Kanagawa (JP); Takuya Imai, Tokyo (JP); Kenichiro Morita, Tokyo (JP); Junpei Mikami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/486,328

(22) Filed: Apr. 13, 2017

(65) Prior Publication Data

US 2017/0311199 A1 Oct. 26, 2017

(30) Foreign Application Priority Data

Apr. 22, 2016 (JP) ................. 2016-086516

(51) Int. Cl.
*H04W 28/02* (2009.01)
*H04W 68/00* (2009.01)
(Continued)

(52) U.S. Cl.
CPC ........ *H04W 28/0268* (2013.01); *H04B 7/145* (2013.01); *H04N 7/147* (2013.01); *H04W 68/005* (2013.01)

(58) Field of Classification Search
CPC combination set(s) only.
See application file for complete search history.

(56) References Cited

U.S. PATENT DOCUMENTS

2003/0135609 A1* 7/2003 Carlson ................ G06F 9/5011
709/224
2004/0261113 A1* 12/2004 Paul ............... H04N 21/234327
725/90
(Continued)

FOREIGN PATENT DOCUMENTS

JP 2013-066188 4/2013

OTHER PUBLICATIONS

Extended European Search Report dated Sep. 5, 2017 in Patent Application No. 17166418.8.
(Continued)

*Primary Examiner* — Joseph J Nguyen
(74) *Attorney, Agent, or Firm* — Oblon, McClelland, Maier & Neustadt, L.L.P.

(57) ABSTRACT

A communication apparatus includes circuitry to: obtain, before transmission of video data to a counterpart communication apparatus via a network, communication environment information to be used for determining magnitude of variation of communication quality of the counterpart communication apparatus; determine, using the obtained communication environment information, a coding setting of the video data in accordance with the magnitude of variation of the communication quality of the counterpart communication apparatus; and code the video data in accordance with the determined coding setting; and a transmitter to transmit the coded video data to the counterpart communication apparatus via the network.

9 Claims, 15 Drawing Sheets

| NUMBER OF COMMUNICATION LAYERS | RESISTANCE TO DETERIORATION OF COMMUNICATION QUALITY |
|---|---|
| ONE LAYER | MORE SUSCEPTIBLE TO DETERIORATION OF COMMUNICATION QUALITY THAN TWO LAYERS OR THREE LAYERS |
| TWO LAYERS | MORE RESISTANT TO DETERIORATION OF COMMUNICATION QUALITY THAN ONE LAYER |
| THREE LAYERS | MORE RESISTANCE TO DETERIORATION OF COMMUNICATION QUALITY THAN ONE LAYER OR TWO LAYERS |

(51) Int. Cl.
  *H04B 7/145* (2006.01)
  *H04N 7/14* (2006.01)

(56) References Cited

U.S. PATENT DOCUMENTS

| | | |
|---|---|---|
| 2008/0068446 A1 | 3/2008 | Barkley et al. |
| 2009/0213746 A1* | 8/2009 | Ariyoshi ............ H04L 41/5009 370/252 |
| 2014/0118475 A1 | 5/2014 | Nagamine et al. |
| 2014/0240450 A1 | 8/2014 | Morita et al. |
| 2014/0244460 A1 | 8/2014 | Imai et al. |
| 2014/0362718 A1 | 12/2014 | Nagamine et al. |
| 2014/0368410 A1 | 12/2014 | Imai et al. |
| 2014/0376609 A1 | 12/2014 | Barkley et al. |
| 2015/0365727 A1 | 12/2015 | Nagamine et al. |
| 2016/0080449 A1 | 3/2016 | Nagamine et al. |
| 2016/0094594 A1 | 3/2016 | Imai et al. |
| 2016/0094595 A1 | 3/2016 | Shiro et al. |
| 2016/0112675 A1 | 4/2016 | Morita et al. |
| 2016/0150183 A1 | 5/2016 | Nagamine et al. |
| 2016/0248819 A1 | 8/2016 | Nagamine et al. |
| 2016/0262206 A1 | 9/2016 | Shiro et al. |
| 2016/0277462 A1 | 9/2016 | Morita et al. |
| 2016/0366425 A1 | 12/2016 | Nagamine et al. |
| 2017/0012793 A1 | 1/2017 | Morita et al. |
| 2017/0031646 A1 | 2/2017 | Imai et al. |
| 2017/0034477 A1 | 2/2017 | Morita et al. |
| 2017/0034482 A1 | 2/2017 | Nagamine et al. |
| 2017/0085604 A1 | 3/2017 | Morita et al. |
| 2017/0094225 A1 | 3/2017 | Morita et al. |

OTHER PUBLICATIONS

Jinwei Cao, et al. "An Overview of Network-Aware Applications for Mobile Multimedia Delivery," IEEE, XP010682891, Jan. 5, 2004, 10 Pages.

Dongsong Zhang, "Delivery of Personalized and Adaptive Content to Mobile Devices: A Framework and Enabling Technology," Communications of the Association for Information Systems, vol. 12, XP055127639, 2003, pp. 183-202.

Yanlin Liu, et al. "Video Redundancy—A Best-Effort Solution to Network Data Loss," Thesis, XP055400617, May 31, 1999, 71 Pages.

U.S. Appl. No. 15/333,330, filed Oct. 25, 2016.
U.S. Appl. No. 15/334,358, filed Oct. 26, 2016.
U.S. Appl. No. 15/340,439, filed Nov. 1, 2016.

\* cited by examiner

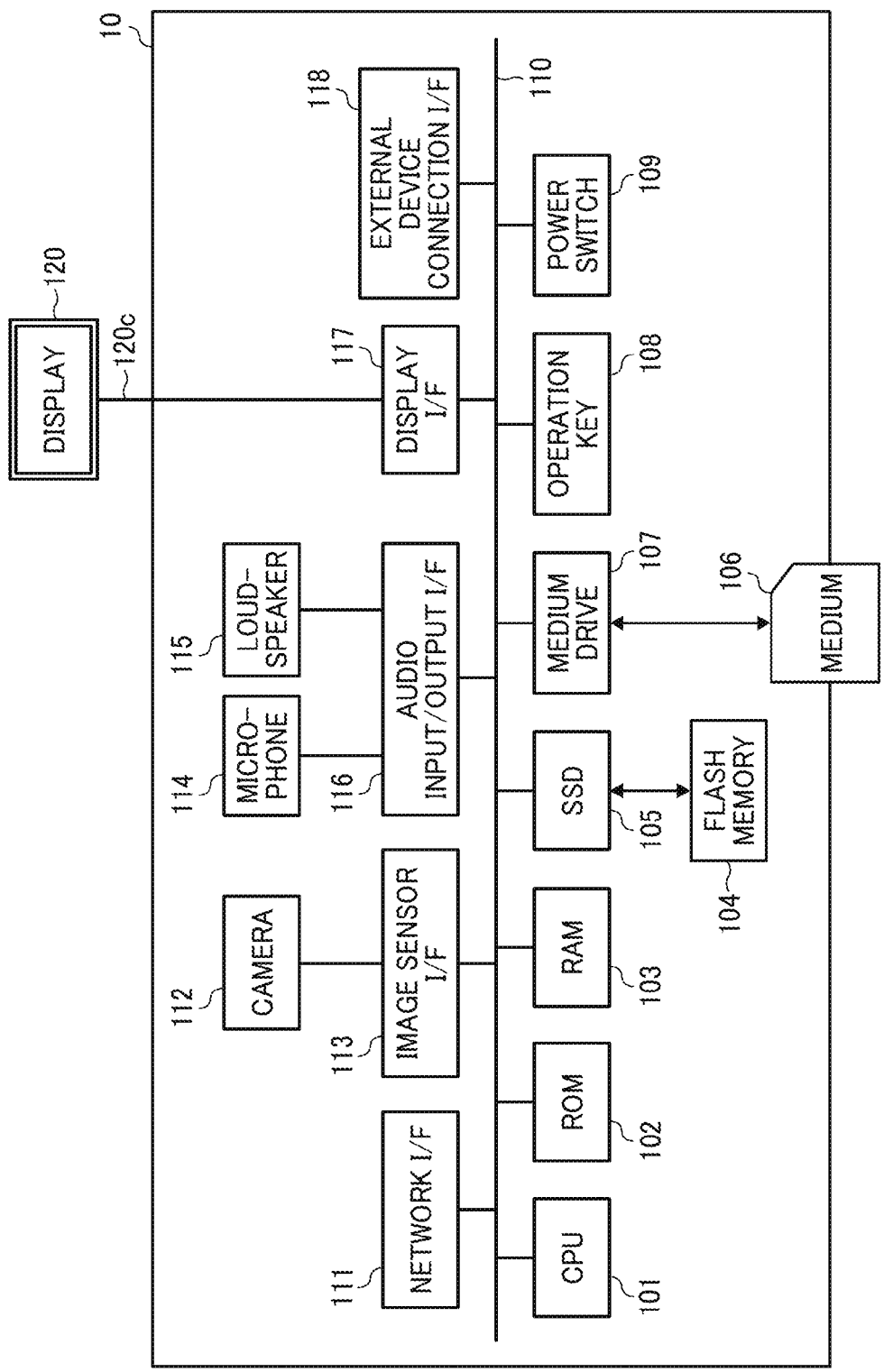

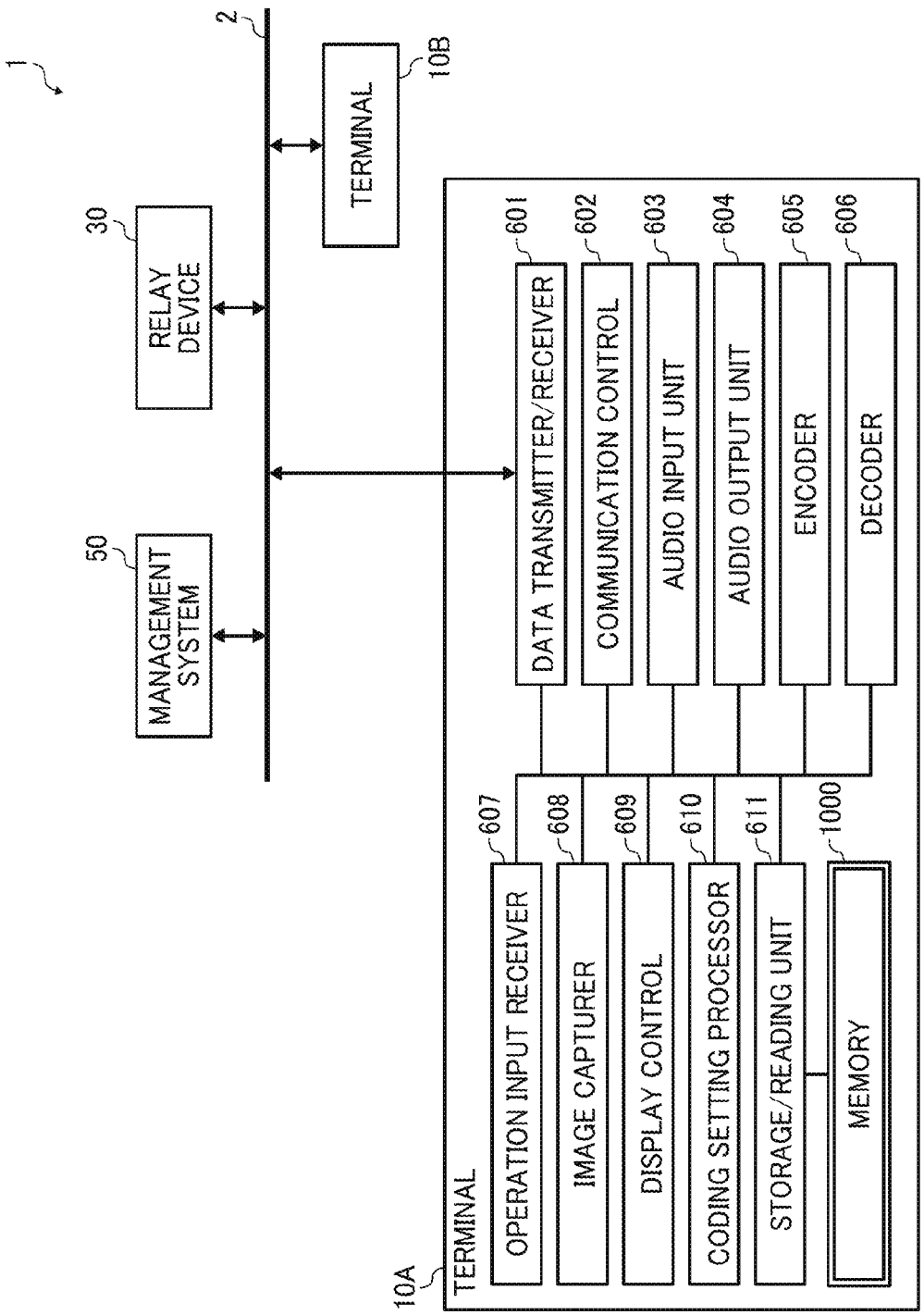

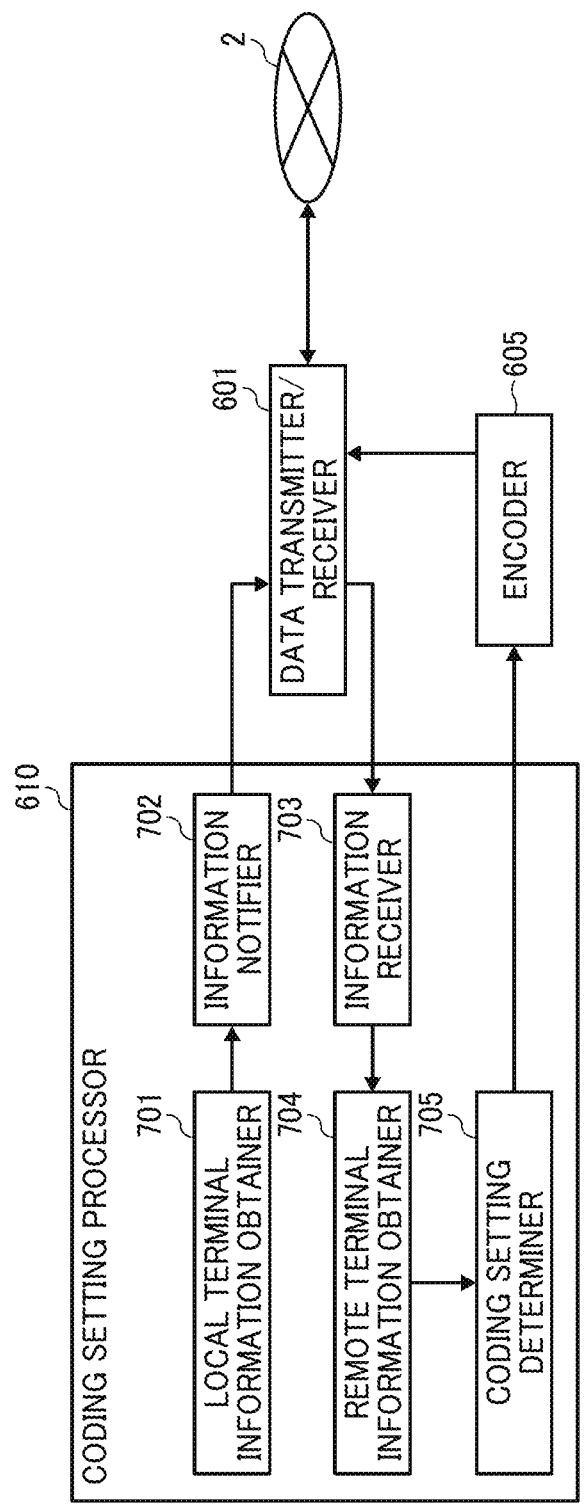

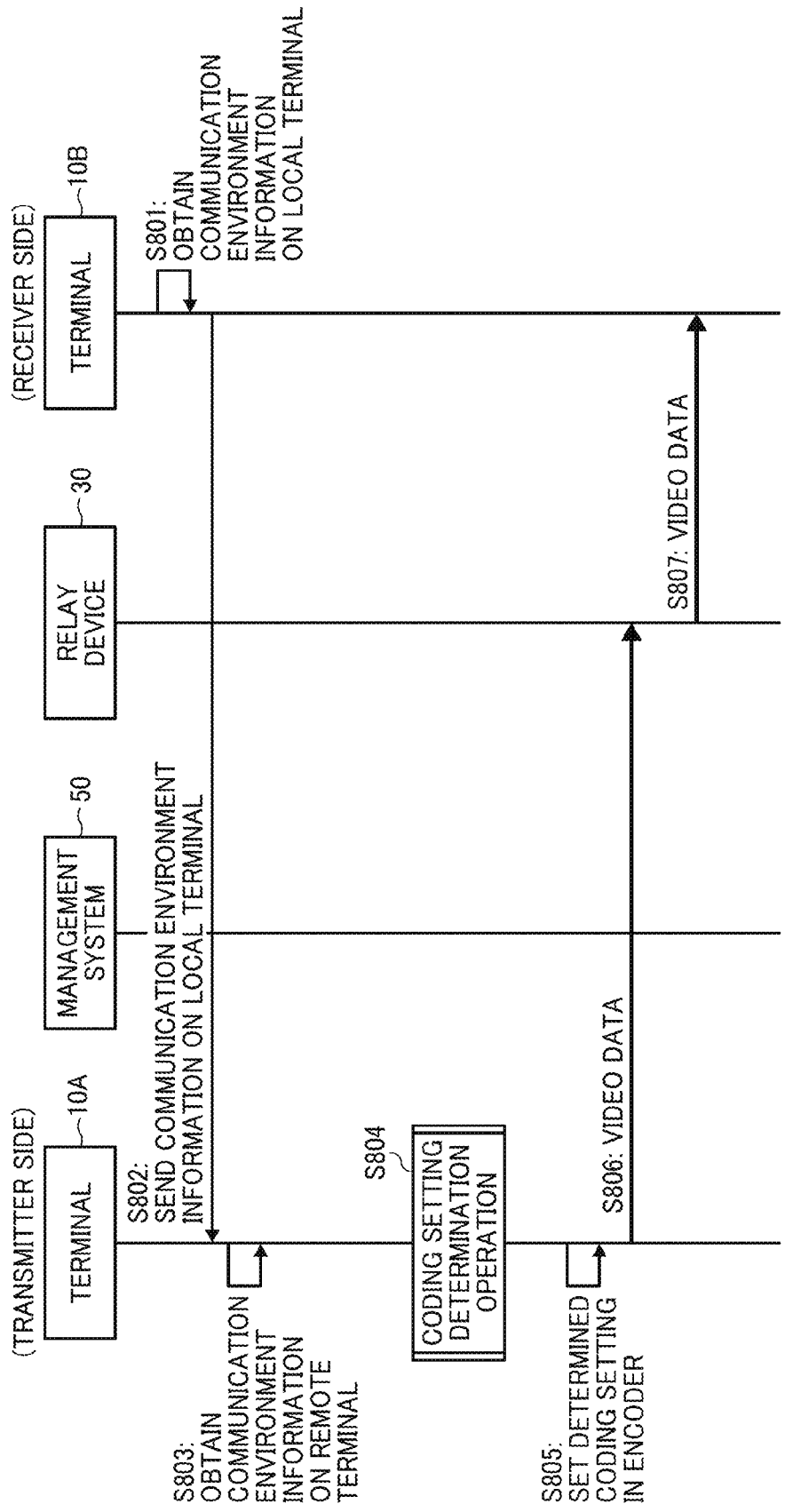

FIG. 9A

| ITEM | COMMUNICATION ENVIRONMENT |
|---|---|
| CONNECTING METHOD | WIRELESS COMMUNICATION/ WIRED COMMUNICATION |
| COMMUNICATION PROTOCOL | UDP/TCP |

FIG. 9B

| CONNECTING METHOD | COMMUNICATION RELIABILITY | VARIATION OF COMMUNICATION QUALITY |
|---|---|---|
| WIRED COMMUNICATION | HIGHER COMMUNICATION RELIABILITY THAN WIRELESS COMMUNICATION | SMALLER VARIATION OF COMMUNICATION QUALITY THAN WIRELESS COMMUNICATION |
| WIRELESS COMMUNICATION | LOWER COMMUNICATION RELIABILITY THAN WIRED COMMUNICATION | GREATER VARIATION OF COMMUNICATION QUALITY THAN WIRED COMMUNICATION |

FIG. 9C

| COMMUNICATION PROTOCOL | COMMUNICATION RELIABILITY | VARIATION OF COMMUNICATION QUALITY |
|---|---|---|
| UDP | LOWER COMMUNICATION RELIABILITY THAN TCP | SMALLER VARIATION OF COMMUNICATION QUALITY THAN TCP |
| TCP | HIGHER COMMUNICATION RELIABILITY THAN UDP | GREATER VARIATION OF COMMUNICATION QUALITY THAN UDP |

FIG. 11A

| RECEIVED COMMUNICATION ENVIRONMENT INFORMATION | | | CODING SETTING |
|---|---|---|---|
| CONNECTING METHOD | COMMUNICATION PROTOCOL | NUMBER OF COMMUNICATION LAYERS | VIDEO DATA |
| WIRED COMMUNICATION | UDP | ONE LAYER | HIGH IMAGE QUALITY |
| WIRED COMMUNICATION | TCP | TWO LAYERS | HIGH IMAGE QUALITY + INTERMEDIATE IMAGE QUALITY |
| WIRELESS COMMUNICATION | UDP | TWO LAYERS | HIGH IMAGE QUALITY + INTERMEDIATE IMAGE QUALITY |
| WIRELESS COMMUNICATION | TCP | THREE LAYERS | HIGH IMAGE QUALITY + INTERMEDIATE IMAGE QUALITY + LOW IMAGE QUALITY |

FIG. 11B

| NUMBER OF COMMUNICATION LAYERS | RESISTANCE TO DETERIORATION OF COMMUNICATION QUALITY |
|---|---|
| ONE LAYER | MORE SUSCEPTIBLE TO DETERIORATION OF COMMUNICATION QUALITY THAN TWO LAYERS OR THREE LAYERS |
| TWO LAYERS | MORE RESISTANT TO DETERIORATION OF COMMUNICATION QUALITY THAN ONE LAYER |
| THREE LAYERS | MORE RESISTANCE TO DETERIORATION OF COMMUNICATION QUALITY THAN ONE LAYER OR TWO LAYERS |

FIG. 13

| RECEIVED COMMUNICATION ENVIRONMENT INFORMATION | | CODING SETTING INFORMATION | |
|---|---|---|---|
| CONNECTING METHOD | COMMUNICATION PROTOCOL | NUMBER OF COMMUNICATION LAYERS | VIDEO DATA |
| WIRED COMMUNICATION | UDP | ONE LAYER | HIGH IMAGE QUALITY |
| WIRED COMMUNICATION | TCP | TWO LAYERS | HIGH IMAGE QUALITY + INTERMEDIATE IMAGE QUALITY |
| WIRELESS COMMUNICATION | UDP | TWO LAYERS | HIGH IMAGE QUALITY + INTERMEDIATE IMAGE QUALITY |
| WIRELESS COMMUNICATION | TCP | THREE LAYERS | HIGH IMAGE QUALITY + INTERMEDIATE IMAGE QUALITY + LOW IMAGE QUALITY |

COMMUNICATION APPARATUS, COMMUNICATION SYSTEM, COMMUNICATION METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-086516, filed on Apr. 22, 2016, in the Japan Patent Office, the entire disclosure of which is hereby incorporated by reference herein.

BACKGROUND

Technical Field

The present invention relates to a communication apparatus, a communication system, a communication method, and a non-transitory recording medium.

Description of the Related Art

Conference systems that hold a teleconference with a remote place via a communication network such as the Internet have been widely used.

Some conference systems transmit, in response to a change of a communication environment of a receiver side that is receiving data from a transmitter side, information indicting the changed communication environment to the transmitter side to secure the Quality of Service (QoS) of data communication.

Since the time at which the transmitter side is notified of the change of the communication environment is after the time at which the communication environment of the receiver side changes, if, for example, the communication quality deteriorates, this deterioration of the communication quality may not be sufficiently handled, resulting in a distorted or interrupted image.

SUMMARY

Example embodiments of the present invention include a communication apparatus including circuitry to: obtain, before transmission of video data to a counterpart communication apparatus via a network, communication environment information to be used for determining magnitude of variation of communication quality of the counterpart communication apparatus; determine, using the obtained communication environment information, a coding setting of the video data in accordance with the magnitude of variation of the communication quality of the counterpart communication apparatus; and code the video data in accordance with the determined coding setting; and a transmitter to transmit the coded video data to the counterpart communication apparatus via the network.

Example embodiments of the present invention include a communication system including: a management system to manage a communication session or communicating video data via a relay device; and a plurality of communication apparatuses to communicate the video data using the communication session, at least one of the plurality of communication apparatus being the above-described communication apparatus.

Example embodiments of the present invention include a communication method performed by the communication apparatus, and a non-transitory recording medium storing a control program for causing the communication apparatus to perform the communication method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a hardware configuration diagram of a terminal according to the embodiment;

FIG. 6 is a functional configuration diagram of the transmission system according to the embodiment;

FIG. 7 is a functional configuration diagram of a coding setting processor according to the embodiment;

FIG. 8 is a sequence diagram illustrating an example of a coding setting operation according to a first embodiment;

FIGS. 9A to 9C are diagrams for describing communication environment information according to the first embodiment;

FIGS. 11A and 11B are diagrams for describing an example of coding settings corresponding to the communication environment information according to the first embodiment;

FIG. 13 is a diagram illustrating an example of coding setting information according to the second embodiment;

Figure 1:
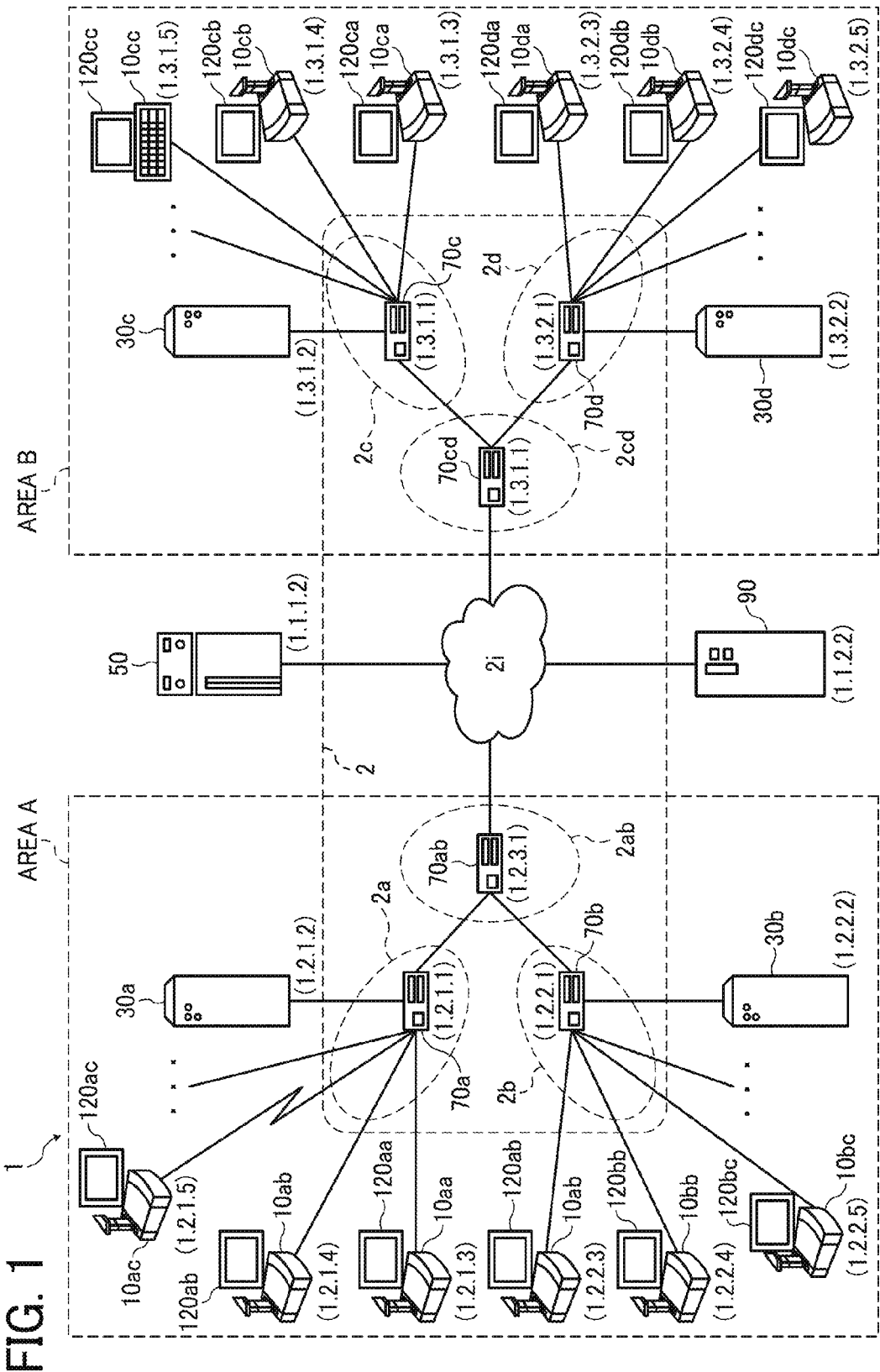
FIG. 1 is a schematic diagram of a transmission system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present invention will be described with reference to the accompanying drawings.

System Configuration

Figure 2:
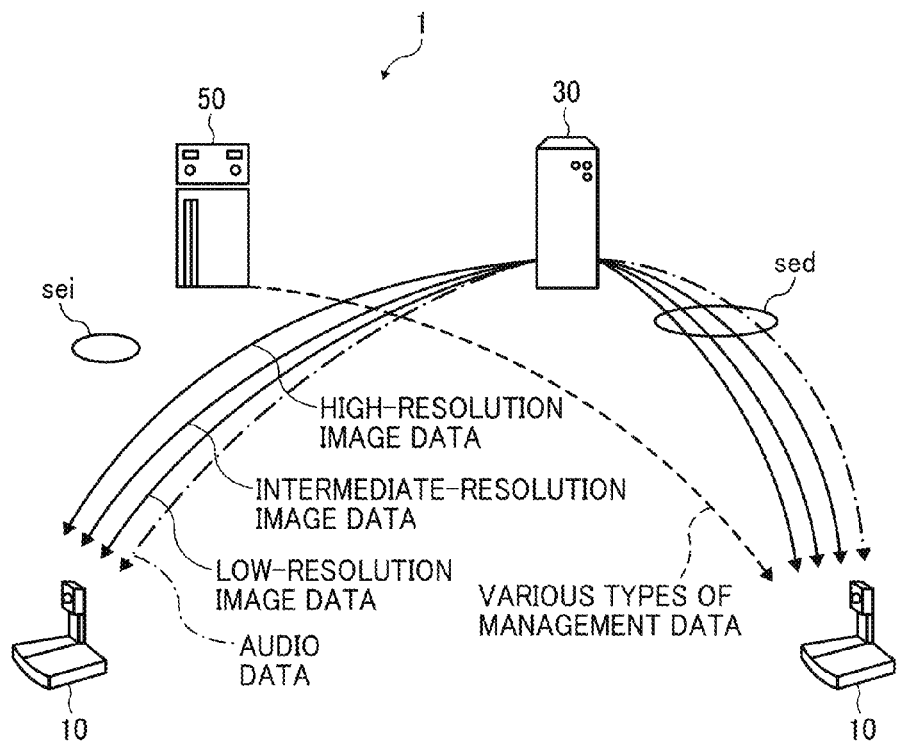
FIG. 2 is an illustration of a transmission/reception state of image data and various types of management data in the transmission system of FIG. 1.
Figure 3A:
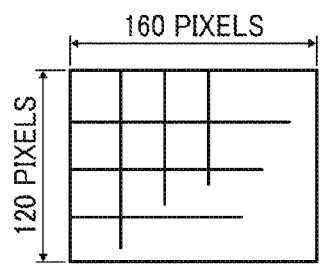
FIGS. 3A to 3C are illustrations for describing the image quality of image data according to the embodiment.
Figure 3B:
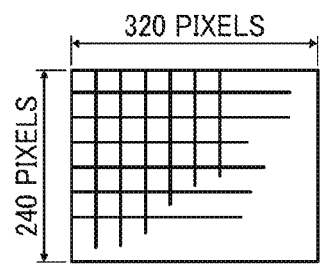
Figure 3C:
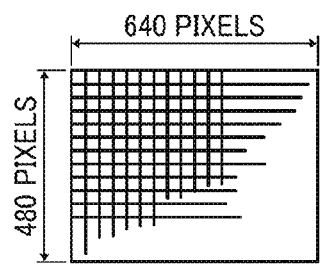

FIG. 1 is a schematic diagram of a transmission system according to an embodiment. FIG. 2 is an illustration of a transmission/reception state of image data and various types of management data in the transmission system of FIG. 1. FIGS. 3A to 3C are illustrations for describing the image quality of image data according to the present embodiment.

The transmission system includes a data providing system that performs one-way transmission of video data from one transmission terminal to another transmission terminal via a transmission management system, and a communication system that intercommunicates information between a plurality of transmission terminals via a transmission management system. Examples of the communication system include a videoconference system and a videophone system.

A transmission system (communication system) 1 illustrated in FIG. 1 includes a plurality of transmission terminals (10aa, 10ab, . . . ), displays (120aa, 120ab, . . . ) for the individual transmission terminals (10aa, 10ab, . . . ), a plurality of relay devices (30a, 30b, 30c, and 30d), a transmission management system 50, and a program providing system 90. The plurality of transmission terminals (10aa, 10ab, . . . ) transmit and receive (communicate) video data between each other. The video data includes, for example, moving image data or still image data, and audio data.

In the following description, the term "transmission terminal" is simply represented as the term "terminal", and the term "transmission management system" is simply represented as the term "management system". In addition, an arbitrary one or ones of the plurality of terminals (10aa, 10ab, . . . ) is/are represented as a "terminal(s) 10". Furthermore, an arbitrary one or ones of the plurality of displays (120aa, 120ab, . . . ) is/are represented as a "display(s) 120", and an arbitrary one or ones of the plurality of relay devices (30a, 30b, 30c, and 30d) is/are represented as a "relay device(s) 30". In addition, a terminal serving as a request sender that sends a request to start communication is represented as a "request sender terminal", and a terminal serving as a counterpart terminal that is a request destination (relay destination) is represented as a "counterpart terminal".

As illustrated in FIG. 2, a management data session sei for transmitting and receiving various types of management data is established between a request sender terminal and a counterpart terminal via the management system 50 in the transmission system 1. In addition, sessions for transmitting and receiving high-resolution image data, intermediate-resolution image data, low-resolution image data, and audio data, respectively, are established between the request sender terminal and the counterpart terminal via a relay device 30. Here, the communication sessions are represented as image/audio data sessions sed. Note that the number of image/audio data sessions sed illustrated in FIG. 2 is only exemplary, and the number may be greater than or less than four.

Here, the resolution of images of image data handled in the present embodiment will be described. In the present embodiment, as illustrated in FIG. 3A, an image serving as a base image, which has 160 horizontal pixels and 120 vertical pixels, is referred to as a low-resolution image. As illustrated in FIG. 3B, an image that has 320 horizontal pixels and 240 vertical pixels is referred to as an intermediate-resolution image. As illustrated in FIG. 3C, an image that has 640 horizontal pixels and 480 vertical pixels is referred to as a high-resolution image.

The low-resolution image illustrated in FIG. 3A is an example of low-image-quality video data. The intermediate-resolution image illustrated in FIG. 3B is an example of intermediate-image-quality video data. The high-resolution image illustrated in FIG. 3C is an example of high-image-quality video data.

Because low-image-quality video data has a data amount that is less than that of intermediate- or high-image-quality video data, the low-image-quality video data can be transmitted using a communication band narrower than that for the intermediate- or high-image-quality video data. Therefore, even if the communication quality deteriorates, low-image-quality video data can be transmitted in a stable manner (hereinafter, this will be referred to as "being resistant to deterioration of the image quality).

Intermediate-image-quality video data has a data amount that is greater than that of low-image-quality video data, and therefore can transmit video data with better quality (such as a higher resolution and a higher frame rate) than the low-image-quality video data. Meanwhile, because intermediate-image-quality video data has a data amount that is greater than that of low-image-quality video data, the intermediate-image-quality video data is transmitted using a communication band wider than that for the low-image-quality video data. Therefore, if the communication quality deteriorates, intermediate-image-quality video data becomes more likely to be distorted or interrupted than low-image-quality video data (being susceptible to deterioration of the communication quality).

High-image-quality video data has a data amount that is greater than that of low- or intermediate-image-quality video data, and therefore can transmit video data with better quality (such as a higher resolution and a higher frame rate) than the low- or intermediate-image-quality video data. Meanwhile, because high-image-quality video data has a data amount that is greater than that of low- or intermediate-image-quality video data, the high-image-quality video data is transmitted using a communication band wider than that for the low- or intermediate-image-quality video data. Therefore, if the communication quality deteriorates, high-image-quality video data becomes more likely to be distorted or interrupted than low- or intermediate-image-quality video data (being susceptible to deterioration of the communication quality).

Coding Setting Method

Before transmitting video data, a terminal (communication apparatus) 10 according to the present embodiment obtains communication environment information for determining the magnitude of variation of the communication quality of a terminal at a transmission destination of the video data.

The communication environment information includes information on the communication environment indicating, for example, whether the method for the transmission destination terminal to connect to a communication network 2 is wired communication (an example of a first communication environment) or wireless communication (an example of a second communication environment). When the connecting method is, for example, wireless communication, the terminal 10 determines that the magnitude of variation of the communication quality is greater than that in the case where the connecting method is wired communication. Note that the method of connecting to the communication network 2 is an example of communication environment information for determining the magnitude of variation of the communication quality of the transmission destination terminal.

When the terminal 10 determines that the magnitude of variation of the communication quality at the transmission destination terminal is small (in the case where the connecting method is wired communication, for example), the terminal 10 sets, for example, a coding setting to transmit video data using one communication layer that only includes high-image-quality video data. In doing so, the communication band for transmitting intermediate-image-quality video data and low-image-quality video data can be saved.

In contrast, when the terminal 10 determines that the magnitude of variation of the communication quality at the transmission destination terminal is great (in the case where the connecting method is wireless communication, for example), the terminal 10 sets, for example, a coding setting to transmit video data using two communication layers that include high-image-quality video data and intermediate-image-quality video data. In doing so, the transmission destination terminal can display high-image-quality video data when the communication quality is good, and display intermediate-image-quality video data if the communication quality deteriorates.

Furthermore, when the terminal 10 determines that the magnitude of variation of the communication quality at the transmission destination terminal is yet greater, the terminal 10 sets, for example, a coding setting to transmit video data using three communication layers that include high-image-quality video data, intermediate-image-quality video data, and low-image-quality video data. In doing so, the transmission destination terminal can display low-image-quality video data even if the communication quality deteriorates further.

In this manner, the terminal 10 according to the present embodiment determines the magnitude of variation of the communication quality of the transmission destination terminal before transmitting video data, and sets a coding setting to transmit the video data using one or more communication layers whose number is in accordance with the determined magnitude of variation of the communication quality. With the terminal (communication apparatus) 10 according to the present embodiment, in the transmission system (communication system), if the communication quality deteriorates, the occurrence of a distorted or interrupted image can be reduced.

Referring back to FIG. 1, the transmission system 1 will be continuously described.

The relay devices 30 illustrated in FIG. 1 relay content data between the plurality of terminals 10. The management system 50 collectively manages login authentication from the terminals 10, the communication states, contact lists, and so forth of the terminals 10, and the communication states and so forth of the relay devices 30.

A plurality of routers (70a, 70b, 70c, 70d, 70ab, and 70cd) each select an optimal path for video data. Hereinafter, an arbitrary one or ones of the routers (70a, 70b, 70c, 70d, 70ab, and 70cd) is/are represented as a "router(s) 70".

The program providing system 90 stores a terminal program for causing each terminal 10 to achieve various functions. The program providing system 90 can provide each terminal 10 with the terminal program.

The program providing system 90 can also provide each relay device 30 with a relay device program for causing the relay device 30 to achieve various functions. Furthermore, the program providing system 90 can provide the management system 50 with a transmission management program for causing the management system 50 to achieve various functions.

In FIG. 1, the terminals (10aa, 10ab, 10ac, . . . ), the relay device 30a, and the router 70a are connected to be communicable with each other by a local area network (LAN) 2a. The terminals (10ad, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are configured in an area A. For example, the area A is Japan, the LAN 2a is configured in an office in Tokyo, and the LAN 2b is configured in an office in Osaka.

In contrast, the terminals (10ca, 10cb, and 10cc), the relay device 30c, and the router 70c are connected to be communicable with each other by a LAN 2c. The terminals (10da, 10db, and 10dc), the relay device 30d, and the router 70d are connected to be communicable with each other by a LAN 2d. In addition, the LAN 2c and the LAN 2d are connected to be communicable with each other by a dedicated line 2cd including the router 70cd and are configured in an area B. For example, the area B is the United States, the LAN 2c is configured in an office in New York, and the LAN 2d is configured in an office in Washington D.C.

In addition, the management system 50 and the program providing system 90 are connected to be communicable with the terminals 10 and the relay devices 30 via the Internet 2i. The management system 50 and the program providing system 90 may be located in the area A or the area B, or may be located in any area other than the area A or B.

In addition in FIG. 1, four digits indicated below each of the terminals 10, each of the relay devices 30, the management system 50, each of the routers 70, and the program providing system 90 indicates an Internet Protocol (IP) address in an abbreviated form in the general IP version 4 (IPv4).

Note that the terminals 10 may be used not only for communication between different offices or for communication between different rooms in the same office, but also for communication within the same room or for outdoor-indoor communication or outdoor-outdoor communication. When the terminals 10 are used outdoors, public wireless communication such as cellular phone communication networks or public wireless LANs are used.

Hardware Configuration

Next, the hardware configuration of the present embodiment will be described.

Hardware Configuration of Terminal

FIG. 4 is a hardware configuration diagram of a terminal according to the present embodiment. The terminal 10 includes the configuration of a general computer, which includes, for example, a central processing unit (CPU) 101, a read-only memory (ROM) 102, a random-access memory (RAM) 103, a flash memory 104, and a solid state drive (SSD) 105. The terminal 10 additionally includes a medium drive 107, an operation key 108, a power switch 109, a network interface (I/F) 111, a camera 112, an image sensor I/F 113, a microphone 114, a loudspeaker 115, and an audio input/output I/F 116. The terminal 10 further includes a display I/F 117, an external device I/F 118, and a bus 110.

The CPU 101 is a computing unit that reads programs and data from, for example, the ROM 102 or the flash memory 104 to execute operations, to achieve functions of the terminal 10. The ROM 102 is a non-volatile memory that stores a program used for operating the CPU 101, such as an initial program loader (IPL). The RAM 103 is a volatile memory used as, for example, a work area for the CPU 101.

The flash memory 104 is a storage device that stores, for example, an operating system (OS), application programs, and various types of data. Under control of the CPU 101, the SSD 105 controls reading/writing of various types of data from/to the flash memory 104. The medium drive 107 controls reading or writing (storage) of data from/to a recording medium 106 such as a memory card.

The operation key 108 is an input unit that receives an input operation of the user of the terminal 10. The power switch 109 is a switch for switching the power of the terminal 10 between on and off. The network I/F 111 is a communication interface for performing communication using the communication network 2.

The camera 112 is an image capturing device for capturing an image of a subject under control of the CPU 101. The image sensor I/F 113 controls image capturing performed by the camera 112, and converts the captured data to certain image data (video data). The microphone 114 converts collected sound to an electric signal. The loudspeaker 115 converts an audio signal to sound and outputs the sound. The audio input/output I/F 116 controls input/output of sound using the microphone 114 and the loudspeaker 115.

The display I/F 117 transfers image data to the display 120 under control of the CPU 101. The external device I/F 118 is an interface for connecting to various external devices. The bus 110 is commonly connected to the above-described configurations, and transfers an address signal, a data signal, and various control signals.

The display 120 is a display device formed of liquid crystal or organic electroluminescence (EL) that displays an image of a subject, an operation icon, and the like. The display 120 is connected to the display I/F 117 by a cable 120c, for example. The cable 120c may be a cable for analog RGB (Video Graphics Array (VGA)) signals, or a cable for component video signals.

Note that the recording medium 106 is a recording medium including, for example, various memory cards. The recording medium 106 is configured to be removable from the terminal 10.

Furthermore, the program for the terminal 10 may be recorded in a file in a format installable or executable on a computer-readable recording medium, such as the recording medium 106, for distribution. Alternatively, the program for the terminal 10 may be stored in, for example, the flash memory 104, or may be stored in advance in the ROM 102.

Hardware Configuration of Management System

Figure 5:
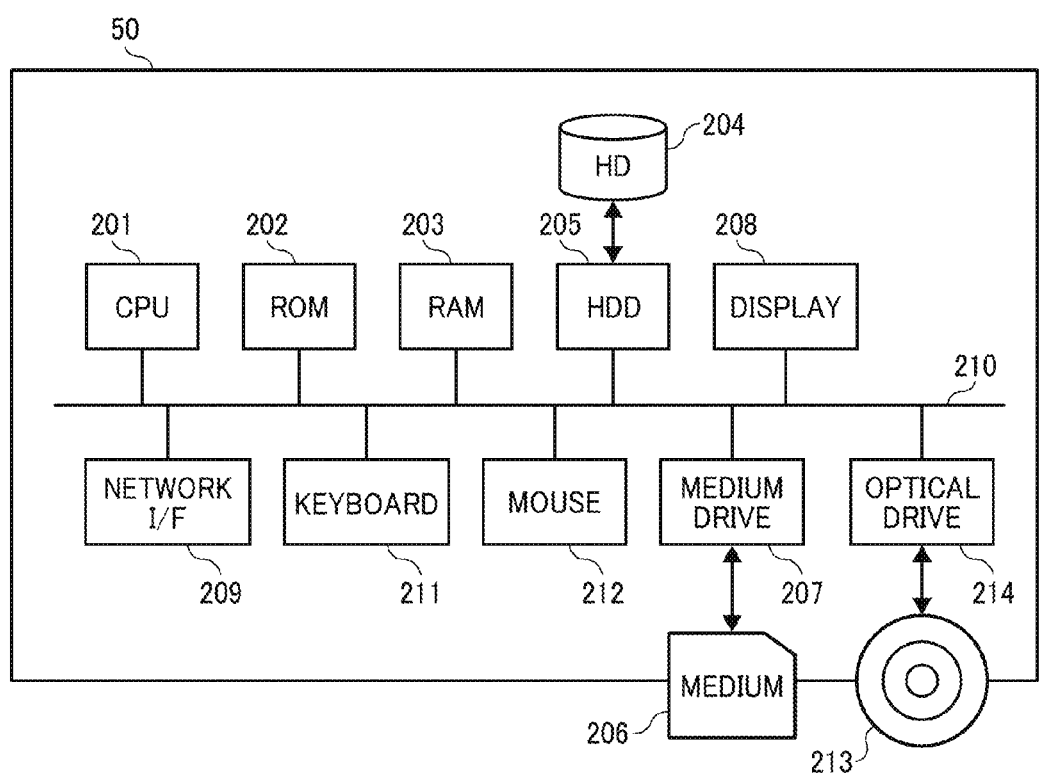
FIG. 5 is a hardware configuration diagram of a management system according to the embodiment.

FIG. 5 is a hardware configuration diagram of the management system according to the present embodiment. The management system 50 has the hardware configuration of a general computer, which includes, for example, a CPU 201, a ROM 202, a RAM 203, a hard disk (HD) 204, a hard disk drive (HDD) 205, a medium drive 207, and a display 208. The management system 50 further includes a network I/F 209, a keyboard 211, a mouse 212, an optical drive 214, and a bus 210.

The CPU 201 is a computing unit that reads programs and data from, for example, the ROM 202 or the HD 204 to execute operations, to achieve functions of the management system 50. The ROM 202 is a non-volatile memory that stores a program used for activating the CPU 201, such as an IPL. The RAM 203 is a volatile memory used as, for example, a work area for the CPU 201.

The HD 204 is a storage device that stores, for example, an OS, application programs, and various types of data. Under control of the CPU 201, the HDD 205 controls reading or writing of various types of data from/to the HD 204. The display 208 is a display that displays various types of information such as a cursor, a menu, windows, characters, or images.

The network I/F 209 is a communication interface for performing data communication using the communication network 2. The keyboard 211 is an example of an input device for receiving an input operation performed by a user, such as an input of characters, numerals, and various instructions. The mouse 212 is an example of a pointing device that receives operations performed by a user, such as selection or execution of various instructions, selection of a to-be-processed target, or movement of the cursor.

The medium drive 207 controls reading or writing (storage) of data from/to a recording medium 206 such as a memory card. The optical drive 214 controls reading or writing of data from/to various types of optical disks 213 serving as examples of a removable recording medium. The bus 210 electrically connects the above-described elements, and transfers an address signal, a data signal, and various control signals.

The hardware configuration of the above-described management system 50 is only exemplary. For example, the display 208, the keyboard 211, and the mouse 212 may be externally connected to the management system 50.

The program for the management system 50 may be recorded in a file in a format installable or executable on a computer-readable recording medium, such as the recording medium 206 or the optical disk 213, for distribution. Alternatively, the program for the management system 50 may be stored in, for example, the HD 204 or may be stored in advance in the ROM 202.

Each relay device 30 has a hardware configuration that is the same as or similar to that of the above-described management system 50, and a description of the relay device 30 is omitted. Note that the HD 204 stores a program for each relay device 30 for controlling the relay device 30.

The program providing system 90 has a hardware configuration that is the same as or similar to that of the above-described management system 50, and a description of the program providing system 90 is omitted. Note that the HD 204 stores a program for the program providing system 90 for controlling the program providing system 90.

Functional Configuration

Next, the functional configuration of the transmission system 1 will be described.

FIG. 6 is a functional configuration diagram of the transmission system according to the present embodiment. In FIG. 6, the terminals 10, the relay device 30, and the management system 50 are connected to be capable of communicating with one another via the communication network 2 in the transmission system 1. For simplicity, the program providing system 90 is omitted in FIG. 6.

Functional Configuration of Terminal

Each terminal 10 includes a data transmitter/receiver 601, a communication control 602, an audio input unit 603, an audio output unit 604, an encoder 605, a decoder 606, an operation input receiver 607, an image capturer 608, a display control 609, a coding setting processor 610, and a storage/reading unit 611. These units are functions that are achieved by or units that function by operating any of the elements illustrated in FIG. 4 in response to a command from the CPU 101 in accordance with the program for the terminal 10. The terminal 10 also includes a memory 1000 implemented by the RAM 103 or the flash memory 104, illustrated in FIG. 4. It is assumed that, in FIG. 6, a terminal 10B has the same functional configuration as a terminal 10A.

The data transmitter/receiver 601, which is executed by the terminal program executed by the CPU 101 illustrated in FIG. 4 in cooperation with the network I/F 111 illustrated in FIG. 4, performs transmission/reception of various types of data (or information) to/from another terminal, apparatus, or system via the communication network 2. For example, the data transmitter/receiver 601 functions as a transmitter that transmits video data coded by the later-described encoder 605 to a transmission destination terminal 10.

The communication control 602 is implemented by, for example, the terminal program executed by the CPU 101 illustrated in FIG. 4. The communication control 602 controls various types of communication, such as establishment or disconnection of a communication session for transmitting/receiving content data to/from another terminal 10 via the relay device 30. When, for example, the power of the terminal 10 is turned on, the communication control 602 controls logging in to the management system 50 and establishes a session for management data via the data transmitter/receiver 601.

The audio input unit 603 is implemented by, for example, the terminal program, executed by the CPU 101 illustrated in FIG. 4, and by the audio input/output I/F 116 illustrated in FIG. 4. The audio input unit 603 converts the voice of the user input through the microphone 114 to an audio signal, and converts the audio signal to certain audio data.

The audio output unit 604 is implemented by, for example, the terminal program, executed by the CPU 101 illustrated in FIG. 4, and by the audio input/output I/F 116 illustrated in FIG. 4. The audio output unit 604 converts the audio data to an audio signal, and outputs the audio signal to the loudspeaker 115, thereby causing the loudspeaker 115 to output sound.

The image capturer 608 is implemented by, for example, the terminal program, executed by the CPU 101 illustrated in FIG. 4, and by the camera 112 and the image sensor I/F 113 illustrated in FIG. 4. The image capturer 608 converts captured image data obtained by capturing an image of a subject to video data (image data), and outputs the video data.

The encoder 605 codes the video data output from the image capturer 608 and the audio data output from the audio input unit 603 to generate coded data (coded video data). The encoder 605 codes the video data input from the image capturer 608 in accordance with, for example, a coding setting set by the later-described coding setting processor 610. The encoder 605 is implemented by, for example, executing, with the use of the CPU 101 illustrated in FIG. 4, a coding/decoding program included in the terminal program.

The decoder 606 decodes coded data (coded video data) received from another terminal 10 via the relay device 30, and outputs the decoded video data and audio data. The decoder 606 is implemented by, for example, executing, with the use of the CPU 101 illustrated in FIG. 4, the coding/decoding program included in the terminal program.

The operation input receiver 607 is implemented by, for example, the terminal program, executed by the CPU 101 illustrated in FIG. 4, and by the operation key 108 and the power switch 109 illustrated in FIG. 4. The operation input receiver 607 receives an input operation performed by the user.

The display control 609 is implemented by, for example, the terminal program, executed by the CPU 101 illustrated in FIG. 4, and by the display I/F 117 illustrated in FIG. 4. The display control 609 displays, for example, the video data decoded by the decoder 606 on the display 120 illustrated in FIG. 4.

The coding setting processor 610 is implemented by, for example, the terminal program, executed by the CPU 101 illustrated in FIG. 4. The coding setting processor 610 performs processing regarding a coding setting of the terminal 10 and another terminal 10 with which the terminal 10 communicates. The coding setting processor 610 includes, for example, as illustrated in FIG. 7, a local terminal information obtainer 701, an information notifier 702, an information receiver 703, a remote terminal information obtainer 704, and a coding setting determiner 705.

FIG. 7 is a functional configuration diagram of the coding setting processor 610 according to the present embodiment.

The local terminal information obtainer (second obtainer) 701 obtains communication environment information on a local terminal (terminal 10). The communication environment information is information for determining the magnitude of variation of the communication quality (such as the communication speed and error rate) of the terminal 10. The communication environment information includes information on the connecting method indicating, for example, whether the method for the terminal 10 to connect to the communication network 2 is wired communication or wireless communication, and information on the communication protocol indicating the type of communication protocol. The communication environment information will be described later.

The information notifier (notifier) 702 notifies a transmission source terminal 10 that transmits video data to the local terminal of the communication environment information on the local terminal, obtained by the local terminal information obtainer 701, via the data transmitter/receiver 601.

The information receiver 703 receives communication environment information on a remote terminal, sent from a transmission destination terminal 10 (remote terminal) to which the terminal 10 transmits video data, via the data transmitter/receiver 601.

The remote terminal information obtainer (first obtainer) 704 obtains communication environment information for determining the magnitude of variation of the communication quality of the transmission destination terminal 10 (remote terminal) to which the terminal 10 transmits video data. For example, the remote terminal information obtainer 704 extracts communication environment information on the remote terminal from information received by the information receiver 703 from the remote terminal.

Using the communication environment information on the remote terminal, obtained by the remote terminal information obtainer 704, the coding setting determiner 705 determines a coding setting of video data in accordance with the magnitude of variation of the communication quality of the transmission destination terminal 10 (remote terminal).

Preferably, the coding setting determiner 705 determines the magnitude of variation of the communication quality of the remote terminal, and selects a coding setting that is more resistant to deterioration of the communication quality as the magnitude of variation of the communication quality of the remote terminal is greater. For example, the coding setting determiner 705 sets the coding setting of the encoder 605 such that video data is transmitted using a greater number of communication layers as the magnitude of variation of the communication quality of the remote terminal is greater. A specific method of determining the coding setting will be described later.

With the above configuration, the coding setting processor 610 determines the magnitude of variation of the communication quality of the transmission destination terminal 10 before the terminal 10 transmits video data, and sets a coding setting in accordance with the determined magnitude of variation of the communication quality.

Referring back to FIG. 6, the functional configuration of the terminal 10 will be continuously described.

The storage/reading unit 611 is implemented by, for example, the terminal program, executed by the CPU 101 illustrated in FIG. 4, and by the SSD 105 illustrated in FIG. 4. The storage/reading unit 611 performs processing to store various types of data in the memory 1000 or to read various types of data stored in the memory 1000.

Functional Configuration of Management System and Relay Device

The management system 50 manages, for example, a communication session for communicating video data between terminals 10. For example, the management system 50 generates a session identification (ID) for identifying a communication session in response to a start request from a request sender terminal (such as the terminal 10B), and notifies a counterpart terminal (such as the terminal 10A) and the relay device 30 of the generated session ID. The request sender terminal and the counterpart terminal establish a communication session with the relay device 30 using the session ID, thereby becoming able to communicate video data with each other. In the present embodiment, the method of managing a communication session, performed by the management system 50, may be any desired method. Here, a detailed description of the management system 50 is omitted.

The relay device 30 relays communication data such as video data transmitted and received between the plurality of terminals 10. In the present embodiment, the method of relaying communication data, performed by the relay device 30, may be any desired method. Here, a detailed description of the relay device 30 is omitted.

Operation

Next, the flow of operation of a coding setting method performed by the transmission system (communication system) 1 according to the present embodiment will be described.

First Embodiment

Coding Setting Operation

FIG. 8 is a sequence diagram illustrating an example of a coding setting operation according to the first embodiment. It is assumed that, at the start point of the operation illustrated in FIG. 8, a communication session has been established between the terminal 10A at the transmitter side of video data and the terminal 10B at the receiver side of video data, and the terminals 10A and 10B can communicate with each other.

In step S801, the local terminal information obtainer 701 of the terminal 10B at the receiver side obtains communication environment information on the terminal 10B.

FIGS. 9A to 9C are diagrams for describing communication environment information according to the first embodiment. FIG. 9A illustrates an example of communication environment information. In the example illustrated in FIG. 9A, items of the communication environment information include information on the "connecting method" and the "communication protocol".

The "connecting method" is information indicating whether the method for the terminal 10B to connect to the communication network 2 is wired communication (first connecting method) or wireless communication (second connecting method). Wired communication and wireless communication are examples of the method for each terminal 10 to connect to the communication network 2.

The "communication protocol" is information indicating whether the communication protocol used by the terminal 10B for communication is the User Datagram Protocol (UDP) or the Transmission Control Protocol (TCP). UDP (first communication protocol) and TCP (second communication protocol) are examples of the communication protocol that each terminal 10 uses for communication.

FIG. 9B illustrates an example of the relationship between the connecting method and the magnitude of variation of the communication quality. As illustrated in FIG. 9B, it is assumed that wired communication has higher communication reliability and smaller variation of the communication quality than wireless communication. In contrast, it is assumed that wireless communication has lower communication reliability and greater variation of the communication quality than wired communication.

The magnitude of variation of the communication quality indicates, for example, the range in which information indicating the communication quality, such as the communication speed or the error rate, changes. For example, because the error rate of wireless communication changes greatly depending on the radio wave circumstances or the position of the terminal 10, wireless communication has greater variation of the communication quality than wired communication.

FIG. 9C illustrates an example of the relationship between the communication protocol and the magnitude of variation of the communication quality. As illustrated in FIG. 9C, UDP has lower communication reliability and smaller variation of the communication quality than TCP. In contrast, TCP has higher communication reliability and greater variation of the communication quality than UDP. For example, because the overhead (additional processing for communication) of a packet re-transmission function or a flow control function is greater in TCP, TCP has higher communication reliability but has greater variation of the communication quality.

Referring back to FIG. 8, the sequence diagram of the coding setting operation will be continuously described.

In step S802, the information notifier 702 of the terminal 10B notifies the terminal 10A of the communication environment information on the terminal 10B, obtained by the local terminal information obtainer 701, via the data transmitter/receiver 601. This notification may alternatively be performed via, for example, the management system 50.

In step S803, the remote terminal information obtainer 704 of the terminal 10A at the transmitter side obtains the communication environment information on the terminal 10B, received by the information receiver 703.

In step S804, the coding setting determiner 705 of the terminal 10A executes a coding setting determination operation. The coding setting determination operation will be described later using FIG. 10.

In step S805, the coding setting determiner 705 of the terminal 10A reflects (sets) the coding setting, determined in step S804, in the coding setting of the encoder 605.

In steps S806 and S807, the encoder 605 of the terminal 10A codes video data on the basis of the coding setting set in step S805, and the data transmitter/receiver 601 transmits the coded video data to the terminal 10B via the relay device 30.

Coding Setting Determination Operation

Figure 10:
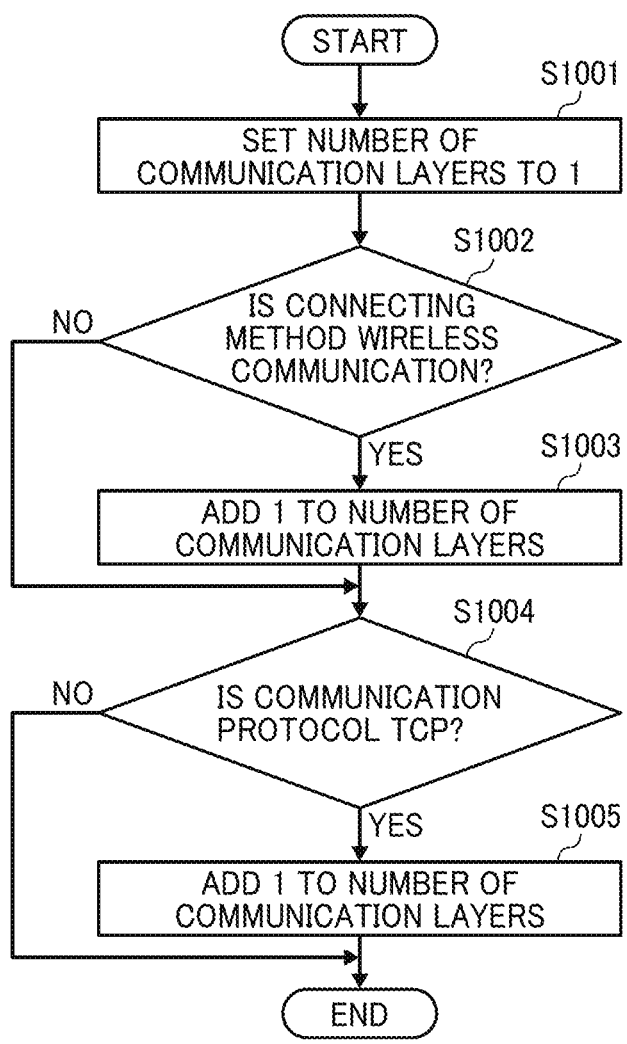
FIG. 10 is a flowchart illustrating an example of a coding setting determination operation according to the first embodiment.

FIG. 10 is a flowchart illustrating an example of a coding setting determination operation according to the first embodiment. This operation corresponds to the coding setting determination operation in step S804 of FIG. 8.

In step S1001, the coding setting determiner 705 of the terminal 10A sets the number of communication layers to "1", which is the initial number. It is assumed that, when the number of communication layers is 1 (one layer), the terminal 10A transmits video data using a first communication layer that only includes high-image-quality video data, as has been described previously.

In step S1002, the coding setting determiner 705 determines whether the connecting method of the terminal 10B is wireless communication or wired communication, on the basis of the communication environment information on the terminal 10B, obtained by the remote terminal information obtainer 704.

When the connecting method of the terminal 10B is wireless communication, the coding setting determiner 705 adds 1 to the number of communication layers in step S1003 to set the number of communication layers to "2". It is assumed that, when the number of communication layers is 2 (two layers), the terminal 10A transmits video data using two communication layers including the first communication layer including high-image-quality video data, and a second communication layer including intermediate-image-quality video data, which is more resistant to deterioration of the communication quality than the first communication layer.

In contrast, when the connecting method of the terminal 10B is not wireless communication but is wired communication, the coding setting determiner 705 causes the operation to proceed to step S1004.

In step S1004, the coding setting determiner 705 determines whether the communication protocol of the terminal 10B is TCP or UDP, on the basis of the communication environment information on the terminal 10B, obtained by the remote terminal information obtainer 704.

When the communication protocol of the terminal 10B is TCP, the coding setting determiner 705 adds 1 to the number of communication layers in step S1005. In contrast, when the communication protocol of the terminal 10B is not TCP but is UDP, the coding setting determiner 705 ends the operation. With this operation, the coding setting is determined, as illustrated in FIG. 11A, in accordance with the communication environment information on the terminal 10B at the receiver side of video data.

FIGS. 11A and 11B are diagrams for describing an example of coding settings corresponding to the communication environment information according to the first embodiment.

As illustrated in FIG. 11A, when the connecting method of the terminal 10B is "wired communication" and the communication protocol thereof is "UDP", the number of communication layers is determined as 1. In this case, the coding setting determiner 705 sets the coding setting of the encoder 605 so as to code only high-image-quality video data (first communication layer).

When the connecting method of the terminal 10B is "wired communication" and the communication protocol thereof is "TCP", the number of communication layers is determined as 2. Likewise, when the connecting method of the terminal 10B is "wireless communication" and the communication protocol thereof is "UDP", the number of communication layers is determined as 2. In this case, the coding setting determiner 705 sets the coding setting of the encoder 605 so as to code two communication layers including high-image-quality video data and intermediate-image-quality video data (second communication layer).

Furthermore, when the connecting method of the terminal 10B is "wireless communication" and the communication protocol thereof is "TCP", the number of communication layers is determined as 3. In this case, the coding setting determiner 705 sets the coding setting of the encoder 605 so as to code three communication layers including high-image-quality video data, intermediate-image-quality video data, and low-image-quality video data (third communication layer).

FIG. 11B illustrates an example of the relationship between the number of communication layers and the resistance to deterioration of the communication quality. As illustrated in FIG. 11B, when the number of communication layers is 1, this one-layer communication is more susceptible to deterioration of the communication quality than two-layer or three-layer communication. However, if the communication quality is stable and there is no deterioration of the communication quality, because neither intermediate-image-quality video data nor low-image-quality video data is transmitted, the communication band can be saved.

When the number of communication layers is 2, this two-layer communication is more resistant to deterioration of the communication quality than one-layer communication. If the communication quality is good, video data can be used with the same high quality as that of one-layer communication. In contrast, this two-layer communication occupies a wider communication band than one-layer communication.

Furthermore, when the number of communication layers is 3, this three-layer communication is more resistant to deterioration of the communication quality than one-layer communication or two-layer communication. If the communication quality is good, video data can be used with the same quality as that of one-layer communication or two-layer communication. In contrast, this three-layer communication occupies a wider communication band than one-layer communication or two-layer communication.

As described above, the coding setting determiner 705 selects a coding setting that is more resistant to deterioration of the communication quality as the magnitude of variation of the communication quality of the transmission destination terminal 10B is greater. Because the coding setting determiner 705 determines the coding setting before video data is transmitted, if the communication quality deteriorates, the video image becomes less likely to be distorted or interrupted.

According to the present embodiment, in the transmission system (communication system) 1 for communicating video data via a network, if the communication quality deteriorates, the terminal (communication terminal) 10 capable of reducing the occurrence of a distorted or interrupted image can be provided.

Second Embodiment

In the first embodiment, the coding setting determiner 705 of the terminal 10 determines the coding setting by performing the coding setting determination operation illustrated in FIG. 10. A second embodiment will discuss an example in the case where the coding setting determiner 705 determines a coding setting of video data using coding setting information stored in advance in the memory 1000 and communication environment information on the transmission destination terminal 10B.

Functional Configuration

Figure 12:
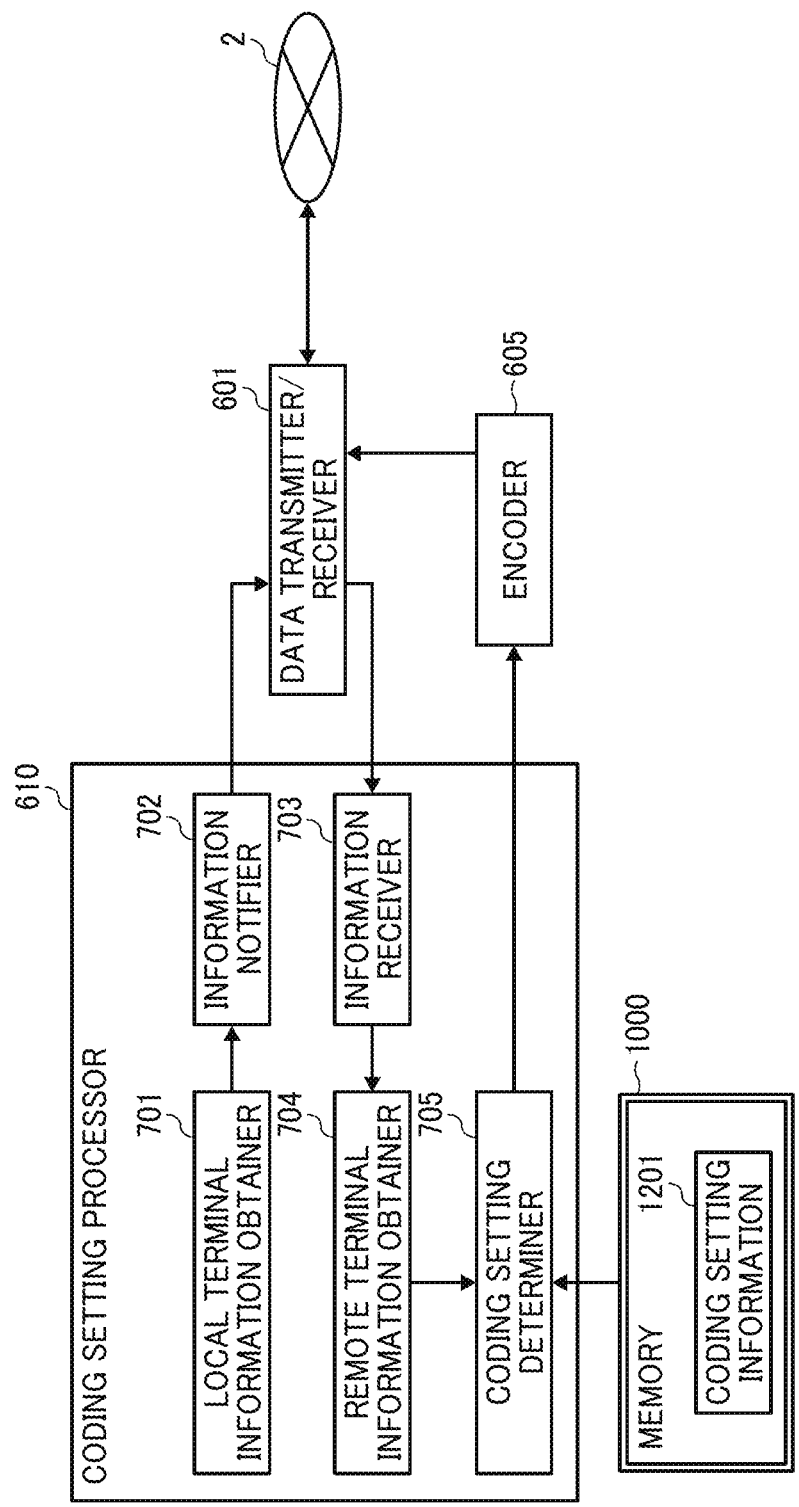
FIG. 12 is a functional configuration diagram of a coding setting processor according to a second embodiment.

FIG. 12 is a functional configuration diagram of the coding setting processor according to the second embodiment. The coding setting processor 610 illustrated in FIG. 12 has the same functional configuration as that of the coding setting processor 610 according to the first embodiment, which is illustrated in FIG. 7. In the second embodiment, the coding setting determiner 705 of the coding setting processor 610 determines a coding setting using communication environment information on the terminal 10B at the receiver side, obtained by the remote terminal information obtainer 704, and coding setting information 1301 stored in advance in the memory 1000.

FIG. 13 is a diagram illustrating an example of coding setting information according to the second embodiment. In the coding setting information 1301 illustrated in FIG. 13, for example, correspondences between items of communication environment information that are the same as the communication environment information illustrated in FIG. 11A and the coding settings are stored in advance. By storing the above-described coding setting information 1301 in advance in the memory 1000, the coding setting determiner 705 can obtain, from the coding setting information 1301, a coding setting corresponding to the communication environment information obtained by the remote terminal information obtainer 704.

Operation

Figure 14:
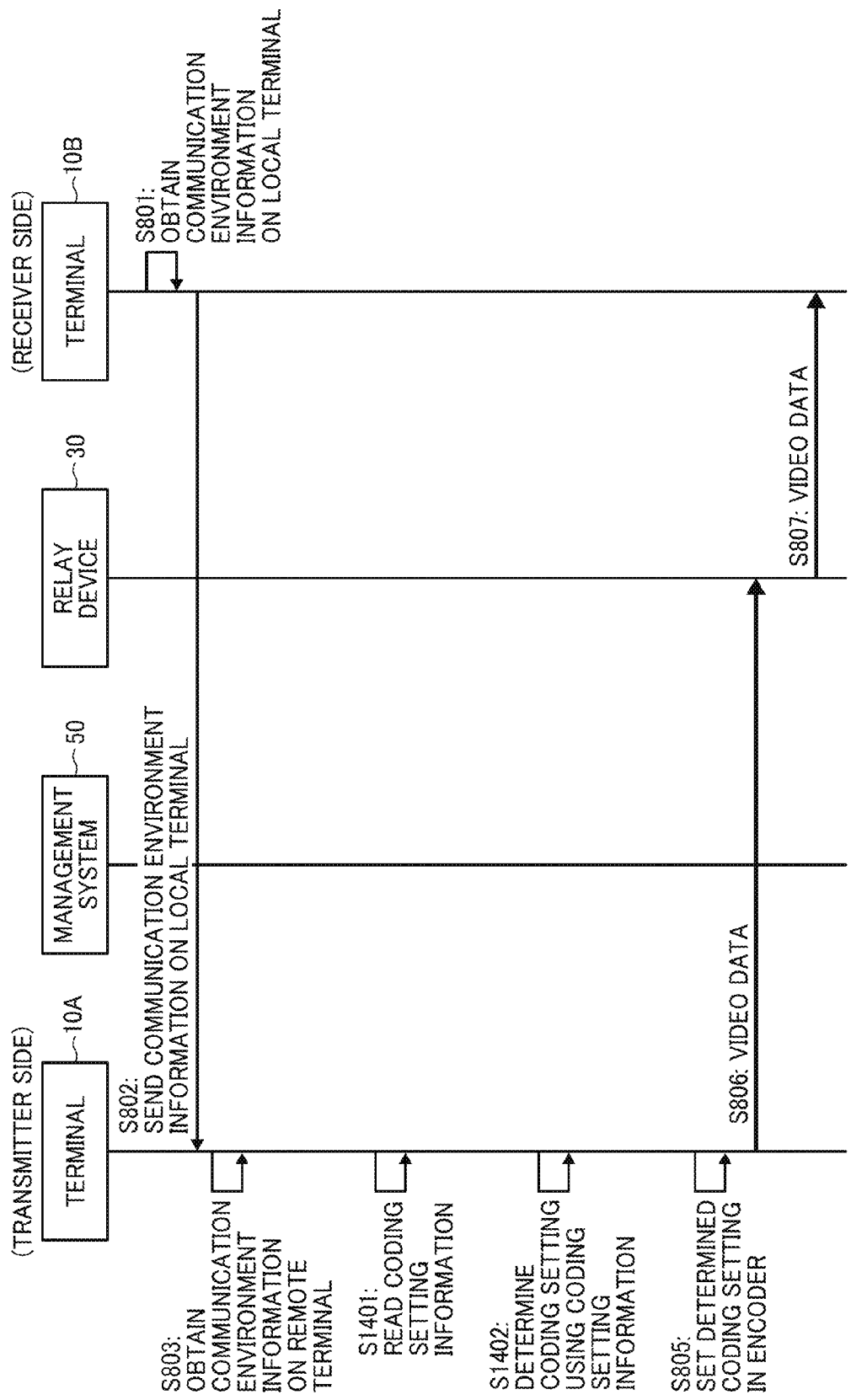
FIG. 14 is a sequence diagram illustrating an example of a coding setting operation according to the second embodiment.

FIG. 14 is a sequence diagram illustrating an example of a coding setting operation according to the second embodiment. Since the operation in steps S801 to S803 and S805 to S807 of FIG. 14 is the same as that in the coding setting operation according to the first embodiment, which is illustrated in FIG. 8, differences from the first embodiment will be mainly described here.

In step S1401, the coding setting determiner 705 of the terminal 10A reads, for example, the coding setting information 1301 illustrated in FIG. 13 from the memory 1000.

In step S1402, the coding setting determiner 705 determines a coding setting using the communication environment information on the terminal 10B, obtained by the remote terminal information obtainer 704, and the coding setting information 1301 read in step S1401.

For example, in the coding setting information 1301 illustrated in FIG. 13, when the connecting method in the communication environment information received from the terminal 10B is "wired communication" and the "communication protocol" is "UDP", a corresponding number of communication layers is "one layer".

When the connecting method in the communication environment information received from the terminal 10B is "wired communication" and the "communication protocol" is "TCP", a corresponding number of communication layers is "two layers".

Likewise, when the connecting method in the communication environment information received from the terminal 10B is "wireless communication" and the "communication protocol" is "UDP", a corresponding number of communication layers is "two layers".

Furthermore, when the connecting method in the communication environment information received from the terminal 10B is "wireless communication" and the "communication protocol" is "TCP", a corresponding number of communication layers is "three layers".

In this manner, it is set in the coding setting information 1301 according to the present embodiment that a coding setting that is more resistant to deterioration of the communication quality will be selected as the magnitude of variation of the communication quality of the transmission destination terminal 10 becomes greater.

According to the present embodiment, for example, by changing information in the coding setting information 1301 stored in the memory 1000, communication environment information and coding setting information corresponding to the communication environment information can be easily set or changed.

Third Embodiment

In the coding setting operation according to the first embodiment, which is illustrated in FIG. 8, it has been described that the terminal 10B at the receiver side transmits the communication environment information on the terminal 10B to the terminal 10A at the transmitter side after a communication session has been established.

A third embodiment will discuss an example in the case where the terminal 10B at the receiver side transmits the communication environment information on the terminal 10B to the terminal 10A at the transmitter side before a communication session is established.

Functional Configuration

Figure 15:
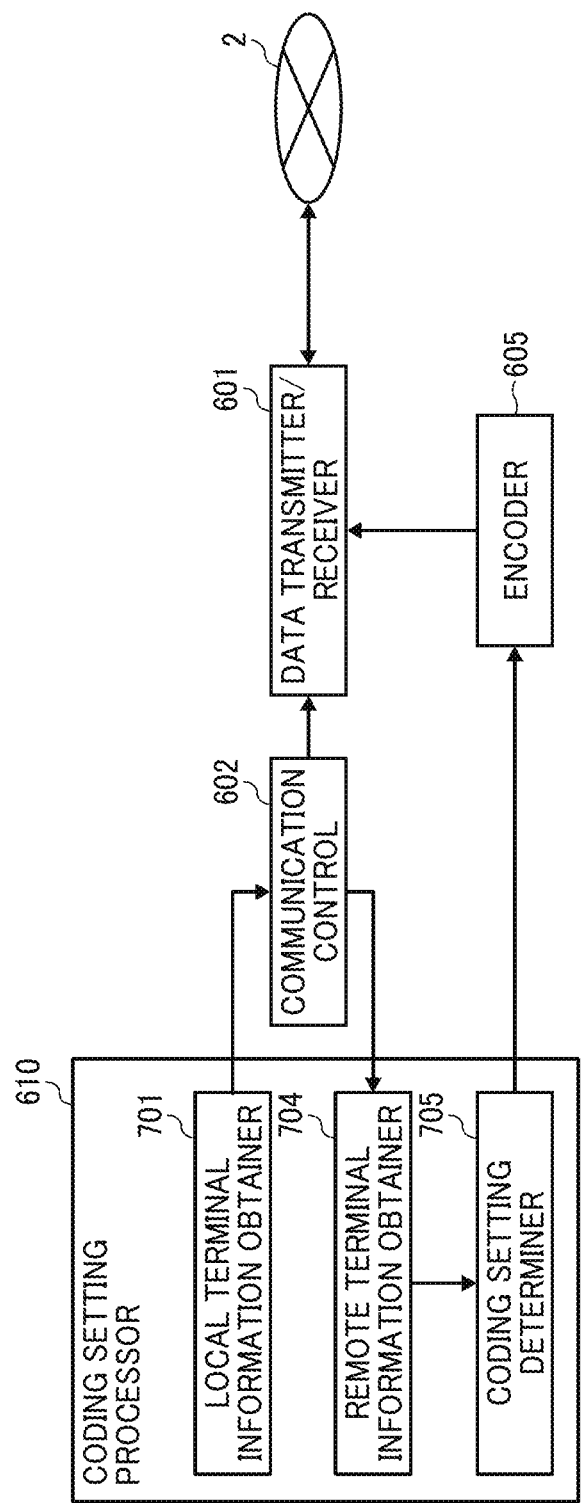
FIG. 15 is a functional configuration diagram of a coding setting processor according to a third embodiment.

FIG. 15 is a functional configuration diagram of the coding setting processor according to the third embodiment. In the functional configuration of the coding setting processor 610 illustrated in FIG. 15, the information notifier 702 and the information receiver 703 included in the coding setting processor 610 according to the first embodiment, illustrated in FIG. 7, are omitted. The local terminal information obtainer 701 and the remote terminal information obtainer 704 of the coding setting processor 610 are connected to the communication control 602.

In the present embodiment, the communication control 602 of the terminal 10 causes the communication environment information on the terminal 10, obtained by the local terminal information obtainer 701, to be included in control information, such as start request information requesting establishment of a communication session, and transmits the control information including the communication environment information to the management system 50. The communication control 602 of the terminal 10 notifies the remote terminal information obtainer 704 of communication environment information on a remote terminal, included in control information received from the management system 50. The other configuration may be the same as the functional configuration of the transmission system 1 and the coding setting processor 610 according to the first embodiment, which are illustrated in FIGS. 6 and 7, respectively.

Operation

Figure 16:
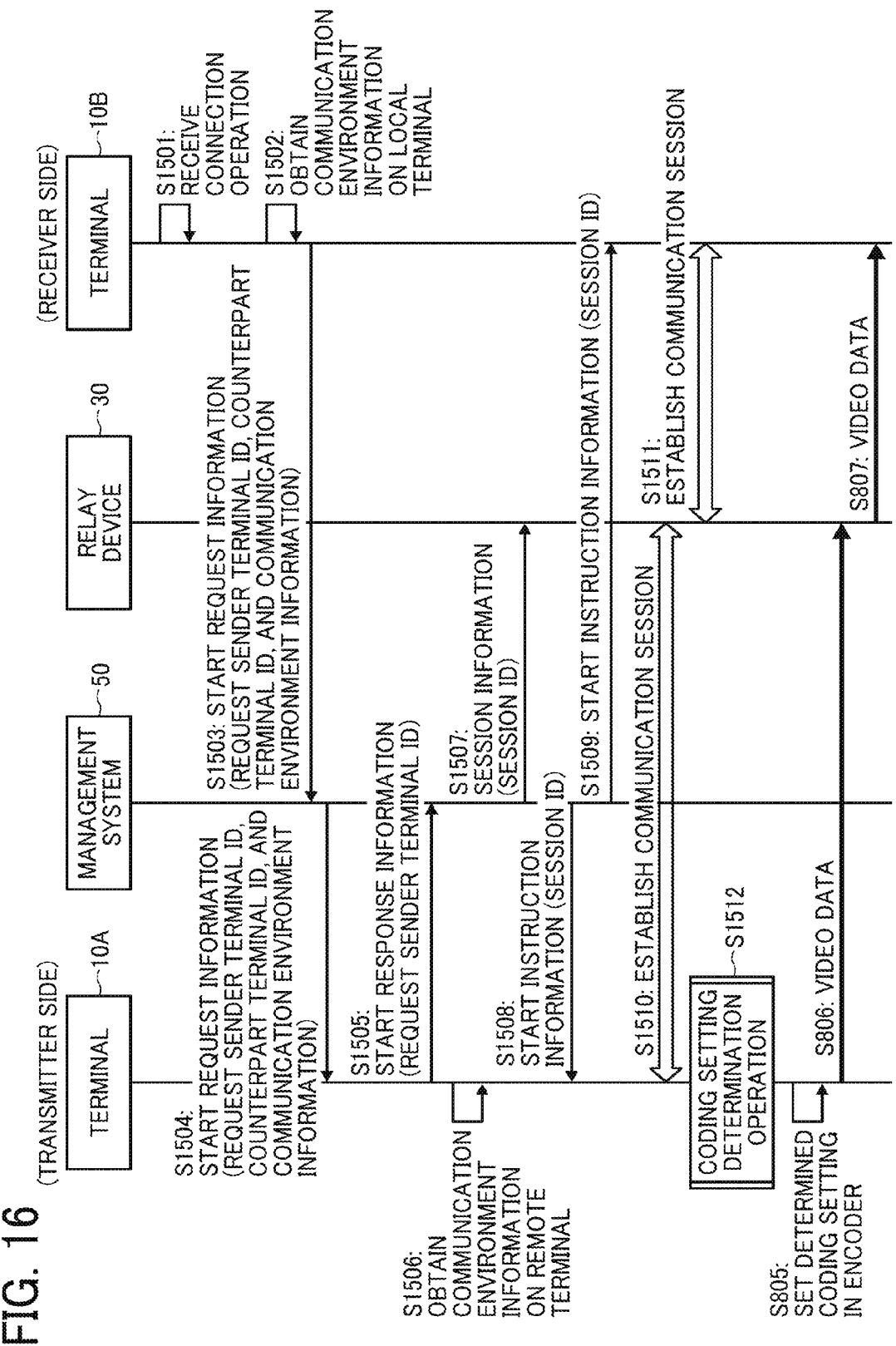
FIG. 16 is a sequence diagram illustrating an example of a coding setting operation according to the third embodiment.

FIG. 16 is a sequence diagram illustrating an example of a coding setting operation according to the third embodiment. It is assumed that, at the start point in FIG. 16, the terminal 10A and the terminal 10B can communicate with the management system 50 using a management data session, but a communication session for communicating video data has not been established.

When the operation input receiver 607 of the terminal 10B at the receiver side receives a connection operation of the user in step S1501, the local terminal information obtainer 701 obtains communication environment information on the terminal 10B in step S1502.

In step S1503, the communication control 602 of the terminal 10B transmits start request information requesting establishment of a communication session to the management system 50. This start request information includes, for example, identification information of the terminal 10B requesting establishment of a communication session (hereinafter referred to as a request sender terminal ID), identification information of the counterpart terminal 10A (hereinafter referred to as a counterpart terminal ID), and the communication environment information on the terminal 10B.

In step S1504, on receipt of the start request information from the terminal 10B, the management system 50 transmits the received start request information to the terminal 10A corresponding to the counterpart terminal ID.

In step S1505, on receipt of the start request information from the management system 50, the communication control 602 of the terminal 10A sends back, for example, start response information indicating the reception of the start request information to the management system 50. At this time, the communication control 602 of the terminal 10A notifies the remote terminal information obtainer 704 of the communication environment information on the terminal 10B, included in the start request information.

In step S1506, the remote terminal information obtainer 704 of the terminal 10A obtains the communication environment information of the terminal 10B, sent from the communication control 602.

In step S1507, on receipt of the start response information from the terminal 10A, the management system 50 generates a session ID that is identification information for identifying a communication session, and notifies the relay device 30 of session information including the session ID.

In steps S1508 and S1509, the management system 50 transmits start instruction information giving instructions to start a communication session to the terminal 10A and the terminal 10B. The start instruction information includes the same session ID as that sent to the relay device 30 in step S1507.

In step S1510, the communication control 602 of the terminal 10A establishes a communication session with the relay device 30 using the session ID included in the start instruction information received from the management system 50.

In step S1511, the communication control 602 of the terminal 10B establishes a communication session with the relay device 30 using the session ID included in the start instruction information received from the management system 50.

The relay device 30 causes the terminal 10A and the terminal 10B, which have established a communication session using the same session ID, to participate in the same session, thereby enabling the terminal 10A and the terminal 10B to perform communication with each other (such as transmission and reception of video data).

In step S1512, the coding setting determiner 705 of the terminal 10A executes, for example, the coding setting determination operation illustrated in FIG. 10 using the communication environment information on the terminal 10B at the receiver side, obtained in step S1506. The operation in steps S805 to S807 thereafter is the same as that in steps S805 to S807 illustrated in FIG. 8.

In this manner, the time point at which the terminal 10B at the receiver side obtains communication environment information on the terminal 10B and transmits the communication environment information to the terminal 10A at the transmitter side may be before establishment of a communication session.

The procedure for establishing a communication session in steps S1503 to S1511 in FIG. 13 is only exemplary. For example, instead of start request information in step S1504, the management system 50 may notify the terminal 10A of start instruction information sent in step S1508 that includes communication environment information on the terminal 10B.

The system configuration in the above-described embodiments is only exemplary, and the transmission system 1 according to the embodiments of the present invention may have various system configurations. For example, the coding setting processor 610 illustrated in FIG. 7 may be partially or entirely included in the management system 50; or the coding setting information 1301 illustrated in FIG. 13 may be stored in the management system 50.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, the identification information of the communication terminal includes any identification information capable of identifying the communication terminal, such as identification information identifying the communication terminal such as a terminal ID, and identification information identifying a user operating the communication terminal such as a user account or a user ID.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication apparatus comprising:
   circuitry to:
   obtain, before transmission of video data to a counterpart communication apparatus via a network, communication environment information to be used for determining magnitude of variation of communication quality of the counterpart communication apparatus;
   determine, using the obtained communication environment information, a coding setting of the video data in accordance with the magnitude of variation of the communication quality of the counterpart communication apparatus; and
   code the video data in accordance with the determined coding setting; and
   a transmitter to transmit the coded video data to the counterpart communication apparatus via the network,
   wherein:
   the communication environment information includes information indicating whether a communication environment of a transmission destination is a first communication environment or a second communication environment, the second communication environment having the magnitude of variation of the communication quality greater than that of the first communication environment; and
   the circuitry selects, when the communication environment of the communication destination is the first communication environment, a coding setting such that the video data is transmitted using a first communication layer, and selects, when the communication environment of the transmission destination is the second communication environment, a coding setting such that the video data is transmitted using the first communication layer and a second communication layer, the second communication layer being more resistant to deterioration of the communication quality than the first communication layer.

2. The communication apparatus according to claim 1, wherein the circuitry selects a coding setting, such that the coding setting becomes more resistant to deterioration of the communication quality as the magnitude of variation of the communication quality of the counterpart communication apparatus increases.

3. The communication apparatus according to claim 1, wherein:
the communication environment information includes information indicating whether a connecting method for the counterpart communication apparatus to connect to the network is a first connecting method or a second connecting method, the second connecting method having the magnitude of variation of the communication quality greater than that of the first connecting method; and
the circuitry selects, when the connecting method is the first connecting method, a coding setting such that the video data is transmitted using a first communication layer, and
selects, when the connecting method is the second connecting method, a coding setting such that the video data is transmitted using the first communication layer and a second communication layer, the second communication layer being more resistant to deterioration of the communication quality than the first communication layer.

4. The communication apparatus according to claim 3, wherein:
the communication environment information includes information indicating whether a communication protocol used by the counterpart communication apparatus for communication is a first communication protocol or a second communication protocol, the second communication protocol having the magnitude of variation of the communication quality greater than that of the first communication protocol; and
the circuitry selects, when the communication protocol is the second communication protocol, a coding setting such that the video data is transmitted further using a third communication layer that is more resistant to deterioration of the communication quality than the second communication layer.

5. The communication apparatus according to claim 1, wherein:
the communication environment information includes information indicating whether a communication protocol used by the counterpart communication apparatus for communication is a first communication protocol or a second communication protocol, the second communication protocol having the magnitude of variation of the communication quality greater than that of the first communication protocol; and
the circuitry selects, when the communication protocol is the first communication protocol, a coding setting such that the video data is transmitted using a first communication layer, and
selects, when the communication protocol is the second communication protocol, a coding setting such that the video data is transmitted using the first communication layer and a second communication layer that is more resistant to deterioration of the communication quality than the first communication layer.

6. The communication apparatus according to claim 1, further comprising:
a memory to store coding setting information indicating a correspondence between the communication environment information and the coding setting, wherein:
the circuitry determines a coding setting of the video data using the communication environment information on the counterpart communication apparatus, and the coding setting information stored in the memory.

7. The communication apparatus according to claim 1, wherein the circuitry is further configured to
obtain communication environment information to be used for determining magnitude of variation of communication quality of the communication apparatus; and
notify the counterpart communication apparatus of the communication environment information being obtained, when the counterpart communication apparatus transmits video data to the communication apparatus.

8. A communication system comprising:
circuitry to:
obtain, before transmission of video data to a counterpart communication apparatus via a network, communication environment information to be used for determining magnitude of variation of communication quality of the counterpart communication apparatus;
determine, using the obtained communication environment information, a coding setting of the video data in accordance with the magnitude of variation of the communication quality of the counterpart communication apparatus;
code the video data in accordance with the determined coding setting; and
transmit the coded video data to the counterpart communication apparatus via the network,
wherein:
the communication environment information includes information indicating whether a communication environment of a transmission destination is a first communication environment or a second communication environment, the second communication environment having the magnitude of variation of the communication quality greater than that of the first communication environment; and
the circuitry selects, when the communication environment of the communication destination is the first communication environment, a coding setting such that the video data is transmitted using a first communication layer, and
selects, when the communication environment of the transmission destination is the second communication environment, a coding setting such that the video data is transmitted using the first communication layer and a second communication layer, the second communication layer being more resistant to deterioration of the communication quality than the first communication layer.

9. A communication method comprising:
obtaining, before transmitting video data to a counterpart communication apparatus via a network, communication environment information for determining magnitude of variation of communication quality of the communication apparatus;

determining, using the communication environment information, a coding setting of the video data in accordance with the magnitude of variation of the communication quality of the counterpart communication apparatus;

coding the video data in accordance with the determined coding setting; and transmitting the coded video data to the counterpart communication apparatus via the network, wherein:

the communication environment information includes information indicating whether a communication environment of a transmission destination is a first communication environment or a second communication environment, the second communication environment having the magnitude of variation of the communication quality greater than that of the first communication environment; and the method selects, when the communication environment of the communication destination is the first communication environment, a coding setting such that the video data is transmitted using a first communication layer, and selects, when the communication environment of the transmission destination is the second communication environment, a coding setting such that the video data is transmitted using the first communication layer and a second communication layer, the second communication layer being more resistant to deterioration of the communication quality than the first communication layer.

* * * * *